Figure 4:
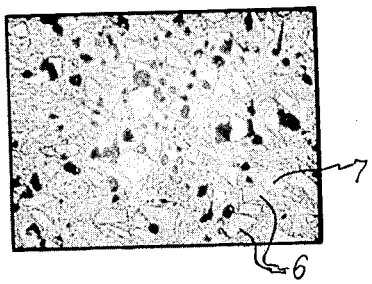

July 9, 1963　　　　　R. H. LESTER　　　　　3,097,101
CERAMIC PRODUCT AND METHOD OF MAKING THE SAME
Filed April 22, 1960　　　　　　　　　　3 Sheets-Sheet 1
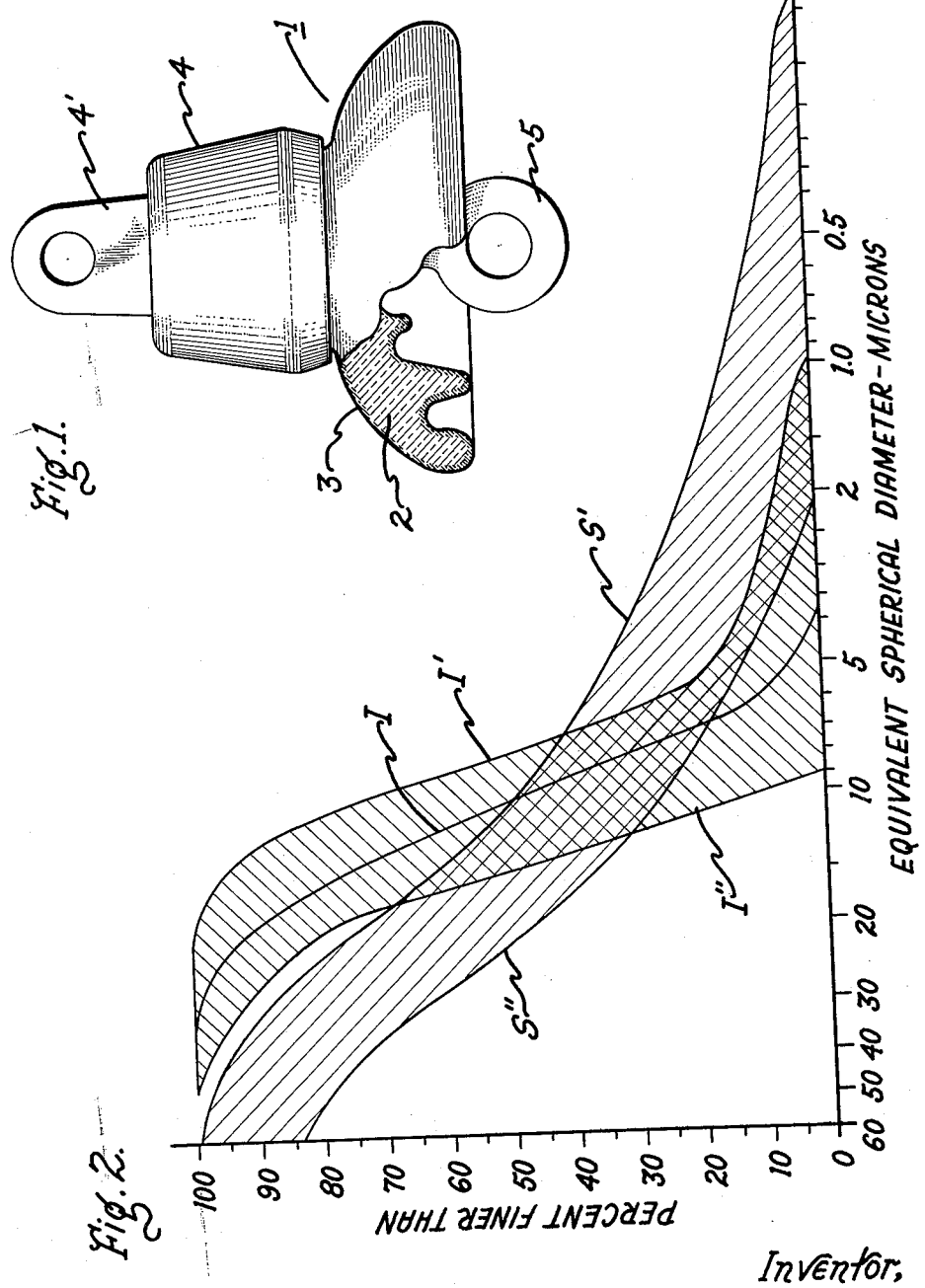
Inventor,
Ronald H. Lester,
by Sidney Greenberg
His Attorney.

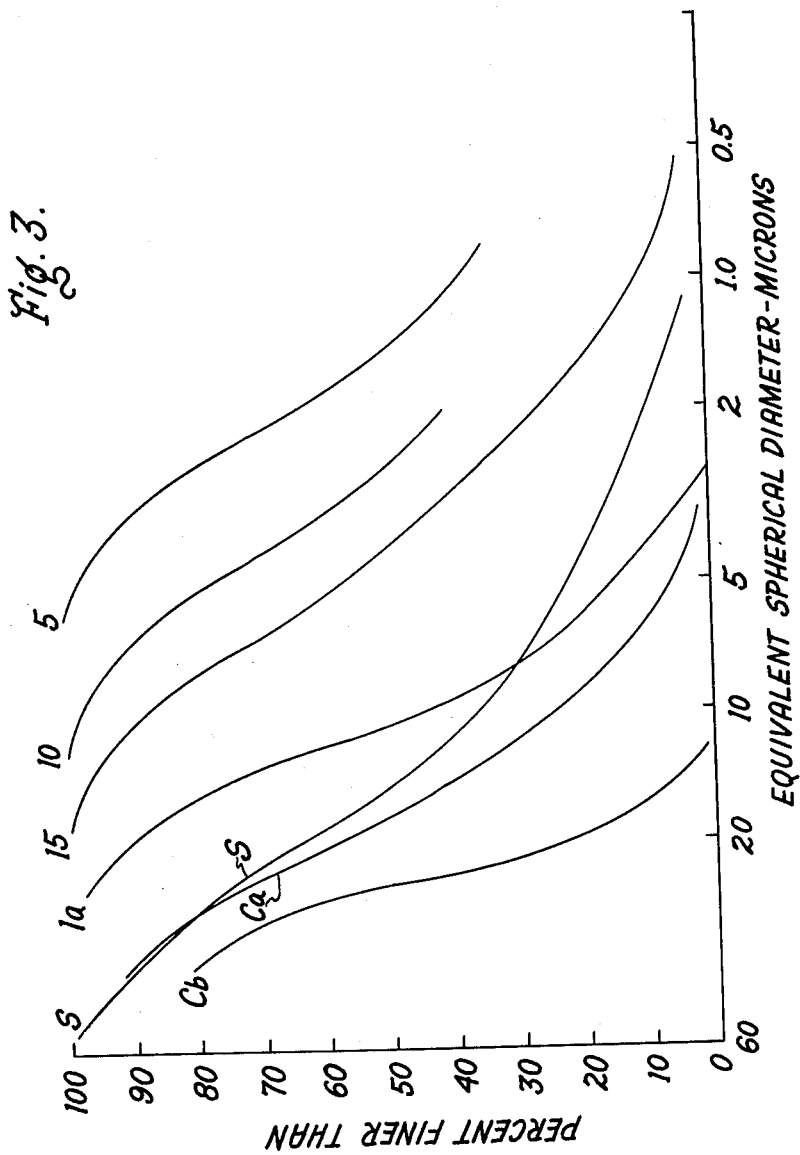

Inventor,
Ronald H. Lester,
by Sidney Greenberg
His Attorney.

United States Patent Office 3,097,101
Patented July 9, 1963

---

3,097,101
CERAMIC PRODUCT AND METHOD OF MAKING THE SAME
Ronald H. Lester, Baltimore, Md., assignor to General Electric Company, a corporation of New York
Filed Apr. 22, 1960, Ser. No. 24,066
14 Claims. (Cl. 106—46)

The present invention relates to ceramic products and more particularly to a porcelain composition for making ceramic products such as electrical insulators and to a method of preparing such a composition.

In the usual manufacture of electrical insulators of ceramic composition, mixtures of ceramic-forming materials are prepared and shaped in the desired form in accordance with well-known procedures and are thereafter fired at elevated temperatures to vitrify the shaped article. The ceramic mix generally employed for making porcelain electrical insulators comprises quartz (usually in the form of flint), feldspar, and clay. Attempts have been made in the past to improve the mechanical strength of the final ceramic products by various means such as by the modification of the mix composition, but in general, previously suggested remedies have not proved entirely satisfactory due to excessive cost, lack of practical value, insufficient improvement, or for other reasons.

It is known in this art that the provision on a porcelain insulator body of a glaze coating having a thermal coefficient of expansion less than that of the porcelain body itself will add strength to the insulator body, due to the compression produced in the glaze coating as a result of the difference in shrinkage of the porcelain and glaze materials. It has been suggested in the past that increased insulator strength can be achieved in accordance with the above principle by providing glaze compositions of lower expansion than those used previously. However, this expedient has not been entirely satisfactory from a practical standpoint because if a glaze is used which has an excessively low thermal expansion relative to the porcelain body, the glaze will crack and fail to perform its intended function.

It is an object of the present invention to provide ceramic insulators having improved mechanical and electrical strength, and a method of making the same.

It is a particular object of the invention to provide porcelain insulators of both glazed and unglazed type having substantially increased mechanical and electrical strength by a simple and economical method.

It is another object of the invention to provide a porcelain material made from clay, quartz, and a flux having increased thermal expansion whereby greater strength is afforded to a glazed insulator product incorporating such a porcelain material.

Other objects and advantages of the invention will become apparent from the following description and claims.

With the above objects in view, the present invention relates to a ceramic body made into a vitrified product from a mixture of clay, a flux such as feldspar, and flint, wherein the particles of flint have sizes falling within a predetermined range as more fully disclosed hereinafter.

It has been found, in accordance with the invention, that by controlling the grain size of the flint component in the above porcelain composition, it is possible by this simple expedient alone to produce a remarkable improvement in the mechanical strength properties of porcelain insulators both of glazed and unglazed types. It has further been unexpectedly found that the dielectric strength of the insulators is increased by such means.

Figure 5:
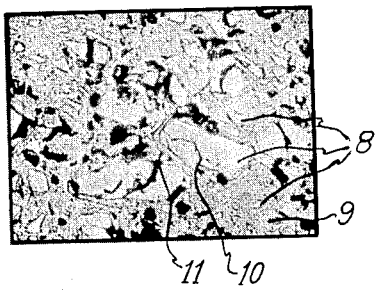
Figure 6:
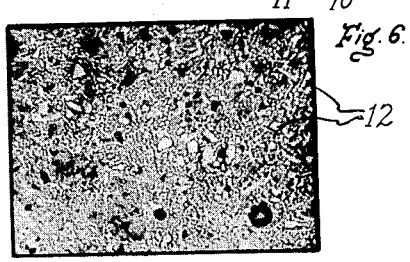

The invention will be better understood from the following description taken in conjunction with the accompanying drawings, in which:

FIG. 1 shows a glazed ceramic electrical insulator, partly broken away, in which the invention may be embodied;

FIG. 2 graphically shows the range of distribution of flint particle sizes employed in accordance with the invention as compared to the size distribution of flint material heretofore used in making porcelain insulators;

FIG. 3 graphically shows the particle size distribution of a variety of flint grades as compared to that of the present invention; and FIGS. 4, 5, and 6 are photomicrographs taken at 500× magnification of sections of porcelain material made, respectively, with flint of a size taught in accordance with the present invention and flint of sizes larger and smaller than that employed in accordance with the invention.

Referring now to the drawings, there is shown in FIG. 1 an electrical insulator 1 of suspension type comprising a ceramic insulating body 2 composed of porcelain and a glaze coating 3 which is of ceramic composition, as more fully described below. Glaze coating 3 makes the surface of the insulator body smooth for the purpose of repelling water and dirt and is further provided for the purpose of increasing the strength of the ceramic body by virtue of having a coefficient of thermal expansion less that that of the ceramic body itself, and thereby being in compression after the usual firing procedure. A metal cap 4 having a clevis 4′ is suitably joined to the crown portion of insulator body 2 in a manner well-known in the art, an eye-bolt 5 being joined to the underside of insulator body 2 in any suitable manner. By means of metal fittings 4′ and 5, a number of insulators of the type shown may be connected to one another to form a string of suspension insulators. It will be understood, however, that the invention is not restricted to the particular form of insulator shown since the principles of the invention are applicable to various and sundry types of ceramic insulator products.

The particular composition of glaze coating 3 may be of a known type and does not per se form a part of the present invention. A typical glaze composition which may be employed is as follows with the ingredients in percent by weight, it being understood that the composition shown is given simply for the purpose of illustration and not limitation:

| | Percent |
|---|---|
| Flint | 32–36 |
| Feldspar | 14–22 |
| Whiting | 14–17 |
| Ball clay | 12–14 |
| China clay | 9–12 |
| Zinc oxide | 0–6 |
| Magnesite | 0–3 |
| Coloring oxides | 0–12 |

Coefficient of expansion:
    $4.7\text{–}5.6 \times 10^{-6}/0\ C.$ at 50–500° C.
    $4.7\text{–}5.8 \times 10^{-6}/°\ C.$ at 50–660° C.

Various modifications of the glaze composition can be employed so long as the thermal expansion properties are not substantially outside the above range of values.

Ceramic body 2 (FIG. 1) in accordance with the invention is preferably composed of the following mixture in percent by weight.

| | Percent |
|---|---|
| Ball clay | 10–45 |
| China clay | 0–40 |
| Flux | 20–35 |
| Flint | 15–35 |

The total clay in the above mixture is within the range of 30–60%. Feldspar is a particularly preferred flux for use in the composition, but other flux materials such as nepheline syenite may be substituted in whole or in part for the feldspar.

In accordance with a preferred embodiment of the invention, the flint component of the mixture is selected to have an optimum size which is within the range of 1–45 microns, and preferably in the range of 8–25 microns. I have found that when made of flint within the latter particle size range, the porcelain body has a maximum increase in strength.

It is the usual practice in the industry to specify grades of flint (or other minerals for that matter) in terms of a curve showing the percent of particles in the desired grade which are finer than indicated sizes, e.g., in terms of equivalent spherical diameter in microns, defined as a millionth part of a meter. In FIG. 2 there are shown, for the purposes of comparison, size distribution curves representing the flint of the present invention and curves representing the prior art size distribution. In the graph, particle sizes in terms of equivalent spherical diameter in microns are plotted against the perecnt of particles finer than the sizes indicated. The hatched area between curves S'—S" represent the size limitations heretofore specified in the industry for standard flints used in the manufacture of electrical porcelain, this size being a 200, 300, or 325 mesh grade. It will be seen from the graph that the sizes of the standard flint grade vary over a wide range, from about 60 microns to less than ½ micron. In contrast to this are curves I'—I" and the hatched area therebetween representing the limits for flint particle sizes selected in accordance with the present invention, hereinafter referred to as "intermediate particle size" or "intermediate flint." Shown also within the hatched area between the limits I'—I" defining the intermediate size distribution is a particularly preferred distribution represented by curve I which has been found to provide optimum benefits in accordance with the invention. As is evident from the graph, the flint sizes selected in accordance with the invention are in an intermediate and a considerably narrower distribution range than the standard flint grade. That is to say, the standard flint sizes heretofore used in electrical porcelain manufacture included a substantial amount of particles which are coarser and finer than those employed in practicing the present invention.

The size distribution range of the flint particles as limited by curves I'—I" in FIG. 2 may be defined by the following table:

TABLE I

| Equivalent spherical diameter (ESD), Microns | Percent finer than ESD | |
| --- | --- | --- |
|  | Upper limit | Lower limit |
| 1 | 0 | 0 |
| 2 | 0 | 0 |
| 3 | 0 | 7 |
| 5 | 10 | 10 |
| 8 | 17 | 17 |
| 10 | 0 | 54 |
| 12 | 9 | 76 |
| 15 | 30 | 88 |
| 20 | 55 | 96 |
| 30 | 81 | 100 |
| 40 | 93 | 100 |
| 45 | 98 | 100 |
|  | 100 | 100 |

The preferred distribution as represented by curve I may be defined as follows:

TABLE II

| Equivalent spherical diameter (ESD), microns: | Percent finer than ESD |
| --- | --- |
| 3 | 0 |
| 5 | 4 |
| 8 | 31 |
| 10 | 48 |
| 12 | 62 |
| 15 | 78 |
| 20 | 92 |
| 30 | 100 |

The following examples will illustrate the compositions and flint size distribution which may be employed in practicing the present invention, the proportions being in percent by weight:

*Example 1*

Ball clay _____ percent__ 15
China clay _____ do____ 25
Nepheline syenite _____ do____ 30
Intermediate flint _____ do____ 30
Modulus of rupture, lbs./in.$^2$:
    Unglazed _____ 11,038
    Glazed _____ 16,336

*Example 2*

Ball clay _____ percent__ 45
Feldspar _____ do____ 30
Intermediate flint _____ do____ 25
Modulus of rupture, lbs./in.$^2$:
    Unglazed _____ 12,605
    Glazed _____ 16,799

*Example 3*

Ball clay _____ percent__ 30
China clay _____ do____ 19
Feldspar _____ do____ 31
Intermediate flint _____ do____ 20
Modulus of rupture, lbs./in.$^2$:
    Unglazed _____ 11,792
    Glazed _____ 16,947

*Example 4*

Ball clay _____ percent__ 30
China clay _____ do____ 30
Feldspar _____ do____ 25
Intermediate flint _____ do____ 15
Modulus of rupture, lbs./in.$^2$:
    Unglazed _____ 11,140
    Glazed _____ 17,221

*Example 5*

Ball clay _____ percent__ 10
China clay _____ do____ 40
Feldspar _____ do____ 30
Intermediate flint _____ do____ 20
Modulus of rupture, lbs./in.$^2$:
    Unglazed _____ 11,500
    Glazed _____ 16,805

*Example 6*

Ball clay _____ percent__ 30
China clay _____ do____ 19
Feldspar _____ do____ 31
Flint A _____ do____ 20
Modulus of rupture, lbs./in.$^2$:
    Unglazed _____ 11,334
    Glazed _____ 16,856

*Example 7*

Ball clay _____ percent__ 30
China clay _____ do____ 19
Feldspar _____ do____ 31
Flint B _____ do____ 20
Modulus of rupture, lbs./in.$^2$:
    Unglazed _____ 11,561
    Glazed _____ 16,965

*Example 8*

Ball clay _____ percent__ 30
China clay _____ do____ 19
Feldspar _____ do____ 31
Flint C _____ do____ 20
Modulus of rupture, lbs./in.$^2$:
    Unglazed _____ 11,738
    Glazed _____ 17,211

Example 9

| | | |
|---|---|---|
| Ball clay | percent | 31 |
| China clay | do | 14 |
| Feldspar | do | 25 |
| Intermediate flint | do | 30 |

Modulus of rupture, lbs./in.$^2$:
- Unglazed _____ 14,174
- Glazed _____ 19,494

The flint employed in each of the above examples was in the form of particles having an intermediate size as defined by the graph in FIG. 2 between curves I'—I". The particle size distribution of flints A, B, and C are more particularly set forth below:

TABLE III

| Equivalent spherical diameter, microns | Percent finer than ESD | | |
|---|---|---|---|
| | Flint A | Flint B | Flint C |
| 40 | 99 | 100 | 100 |
| 30 | 95 | 97 | 100 |
| 20 | 83 | 85 | 91 |
| 10 | 40 | 36 | 43 |
| 5 | 7 | 16 | 14 |
| 3 | 0 | 10 | 1 |

The particular glaze composition used in the above examples was as follows, in percent by weight:

| | Percent |
|---|---|
| Clay | 23.2 |
| Feldspar | 17.5 |
| Whiting | 16.3 |
| Flint | 32.0 |
| Coloring oxides | 11.0 |

In the mechanical strength tests indicated above, ¾" test rods were used with a span of 5". The load was applied at a rate of 600 lbs./min.

In a typical manufacturing method for making ceramic products using the composition of the present invention, the process starts with the accurate blending of the raw materials, and mixing the material with water in "blungers" to uniformly disperse the ingredients. Foreign materials are removed from the resulting mix (or "slip") by suitable known means, and the slip is then aged or stored until needed. Prior to use, the slip is treated in a filter press to remove excess moisture, and the resulting clay is passed through a shredder to provide small pieces which are then compacted into "pugs" and cut to the desired length for further processing. The subsequent processing varies depending upon the method of shaping to be used, and one of these standard shaping methods is known as "hot plunging." In this process, commonly used for the manufacture of suspension insulators, the pug is pre-shaped and tamped into a suitable mold, after which it is subjected to the action of a hot spinning plunger which is moved downward to form the bottom of the suspension shell. After the units are removed from the mold, dried and trimmed to desired dimensions, they are provided with a coat of compression glaze, and placed in a kiln for conversion into porcelain. The ceramic shell is fired to a temperature of about 1150–1300° C., or more specifically to Orton Pyrometric cone 10 to 12, after which it is assembled with metal hardware which is cemented in place.

Instead of employing a plastic molding process such as "hot plunging" the shape of the unit may be obtained by the slip casting method, wherein the clay slip treated with suitable dispersing chemicals is poured into a suitable mold wherein the water is removed and the raw porcelain composition is deposited on the walls of the mold. The solidified piece may then be removed from the mold and further finished and dried as in the previously described process.

In preparing the ingredients of the composition, I have found that best results are obtained by first mixing together the clay and flux ingredients by usual methods to obtain a slip, and then adding the intermediate flint into the slip thus obtained. The mixing of the intermediate flint into the batch of the remaining ingredients can be carried out by any suitable known methods but care must be taken that the mixing method and the mixing period used must not be such as to reduce the size of the flint by any appreciable amount.

Flint of the intermediate size distribution employed in practicing the invention may be obtained by the use of conventional air fractionating equipment or other types of mineral fractionating apparatus well known and presently used in the art, and such flint is available from commercial producers of minerals.

FIG. 3 shows by means of a graph plotted similarly to that of FIG. 2 curves representing the particle size distribution of various flint grades studied in connection with the invention. Curves 5, 10 and 15 represent flints finer in size than the intermediate flint of the invention identified as curve $I_a$, while curves $C_a$ and $C_b$ represent coarser flints, and curve S represents a typical standard grade flint described previously.

Table IV below sets forth the results obtained in experiments carried out with samples of porcelain containing the above-mentioned various grades of flint to determine their strength and thermal expansion properties:

TABLE IV

| Grade flint | Bending modulus of rupture lbs./in.$^2$ on ¾" rods, 5" span | | Interferometer thermal expansion 50–750° C. × 10$^{-6}$ |
|---|---|---|---|
| | Unglazed | Glazed | |
| 5 | 8,392 | 2,812 | 4.62 |
| 10 | 9,864 | 7,671 | 5.41 |
| 15 | 11,293 | 13,286 | 5.69 |
| $I_a$ | 11,738 | 17,211 | 6.42 |
| $C_a$ | 11,359 | 16,083 | 6.50 |
| S "Standard" | 10,800 | 15,000 | 6.21 |
| $C_b$ | 9,535 | 14,139 | 5.99 |

The samples of porcelain made with flint grades 5 and 10 were found to be glassy in nature and the glaze thereon was in tension. The porcelain with flint grade 15 had insufficient thermal expansion and the glaze coating thereon was not in optimum compression. The $C_a$ sample, with relatively coarse flint grains, showed more evidence of microscopic cracks in the microstructure than the $I_a$ sample, while the still coarser flint sample $C_b$ was relatively porous and weaker than the $C_a$ sample.

As will be seen from the Table IV, substantially greater strength in terms of modulus of rupture characterized both the glazed and unglazed porcelain samples $I_a$ having the intermediate size flint than all of the other samples tested. While the thermal expansion of the intermediate size flint is slightly less than that of the $C_a$ sample, it is apparent that any benefits from the $C_a$ sample in this respect were outweighed by the disadvantages resulting from its tendency to crack due to the presence of the coarser flint particles.

It has further been found unexpectedly in accordance with the invention that the use of the intermediate flint, in addition to increasing the mechanical strength, improves the dielectric strength of the porcelain to a remarkable extent. The following examples show the dielectric strength as well as mechanical strength of intermediate flint porcelain compositions as compared to a porcelain composition with a standard flint:

| | Example 9, standard flint | Example 10, intermediate flint | Example 11, intermediate flint |
|---|---|---|---|
| Ball Clay | 30 | 30 | 31 |
| China Clay | 19 | 19 | 14 |
| Feldspar | 31 | 31 | 25 |
| Flint | 20 | 20 | 30 |
| Unglazed Modulus of Rupture, lbs./in.$^2$ | 10,800 | 11,242 | 14,174 |
| Glazed Modulus of Rupture lbs./in.$^2$ | 15,000 | 16,168 | 19,494 |
| Dielectric Strength, volts/mil (under oil at thickness of 0.220 in.) | 230 | 270 | 299 |

As will be seen from the above results, which have been confirmed by additional testing, the use of intermediate flint in the porcelain composition markedly increases the dielectric strength of the final ceramic product. While the exact reason has not been established, it is believed that the improvement may be due to the greater quantity of crystalline material present in the products made from Examples 10 and 11.

It is thus apparent that the use of the intermediate size flint results in heretofore unrealized values of mechanical and electrical strength for porcelain ceramic products.

The improvement afforded by the use of immediate size flint as described appears due to a number of factors. It has been observed that flint grains which are coarser than the intermediate size of the invention tend to crack away from the matrix of the porcelain body, thus weakening the structure of the unglazed porcelain. Coarse flint grains also result in poor particle packing and increased voids which further contribute to weakening of the unglazed porcelain. On the other hand, flint grains finer than those employed in accordance with the invention more readily dissolve in the matrix, and the physical structure of the unglazed porcelain is thereby weakened. Moreover, such dissolution of the fine grains weakens the glazed porcelain in another respect, in that the porcelain has lower thermal expansion and there results a lowered compression in the glaze coating.

In connection with the invention, a number of porcelain samples having various flint sizes were microscopically examined. FIGS. 4, 5 and 6 are photomicrographs of three of these samples taken at a magnification of 500×. FIG. 4 shows a porcelain sample having an intermediate size flint in accordance with the invention. FIG. 5 is that of a conventional porcelain sample having flint of standard size distribution, hence with grains larger and smaller than those employed in the invention, whereas FIG. 6 shows a porcelain sample having flint particles smaller in size than those used in the present invention.

As will be seen from the FIG. 4 microphotograph, the microstructure of the porcelain sample of the present invention is characterized by the absence of both excessively large and excessively fine quartz grains. The microstructure shows the flint grains 6 dispersed in a matrix 7 composed for the most part of non-crystalline glassy material. As will be seen, the sample is free from cracked quartz grains or cracks in the matrix surrounding the quartz grains. Overall, there is more crystalline material in the FIG. 4 microstructure than in the samples shown in FIGS. 5 and 6.

The FIG. 5 microstructure which represents a sample of the commercial high voltage porcelain material conventionally used shows a wide variation in the size of flint particles 8 in the surrounding matrix 9. As will be seen, the larger flint particles are shattered with cracks 10 and 11 extending out into the matrix.

The FIG. 6 microstructure of a porcelain sample containing fine flint shows less crystalline material than the structures of FIGS. 4 and 5. As will be seen, flint particles 12 are on the average much smaller than the flint particles in the other examples, and, as a result, the sample is composed of a much larger proportion of non-crystalline material. The specimen, accordingly, is very glossy.

It will be thus seen from the foregoing that the intermediate size flint grains employed in accordance with the invention increases the mechanical and electrical strength of the clay-flint-feldspar porcelain over known types of porcelain because of the increased crystalline content of the final product, the reduction in the glass phase present in the final product, the absence or reduction in cracks present in the porcelain body and the glaze thereon, and the increased thermal expansion of the final porcelain body. The last mentioned feature is of particular importance since it enables the attainment of a greater compression in the glaze coating than is possible simply by using a low expansion glaze composition. The use of low expansion glaze compositions as heretofore suggested for the purpose of increasing the strength of the ceramic material has a practical limit, after which further reduction in thermal expansion of the glaze produces no improvement in the mechanical strength of the porcelain. On the other hand, it has been found that by increasing the expansion of the porcelain body, a greater compression could be introduced in the glaze layer. The use of an intermediate size flint in the porcelain mixture in accordance with the invention provides a practical, economical, and remarkably effective means for attaining the optimum increase in such expansion of the porcelain body.

The thermal expansion data set forth herein was obtained by the Interferometer method using a Gaertner Dilatation Interferometer of Fizeau type, sample size .1500–.1700 inch, with the rate of heating 3° C./min., and calibrated with fused quartz samples equal to $0.58 \times 10^{-6}$ cm./cm./° C., 0–700° C.

The particle sizes were determined by the method described by R. H. Lester in vol. 37, No. 3 (1958), American Ceramic Society Bulletin, pages 129–134. The size distribution from 60–20 microns was checked by screens and decantation methods.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A ceramic body comprising the vitrified porcelain product of a mixture of clay, flux material, and flint, the flint being in particles all of which have a size between 1 and 45 microns.

2. A ceramic body comprising the vitrified product of a mixture of clay, flux material, and flint, the flint being in particles having a size between 8 and 25 microns.

3. A ceramic body as defined in claim 1, wherein the mixture has the following approximate composition in percent by weight:

|  | Percent |
| --- | --- |
| Clay | 30–60 |
| Flint | 15–35 |
| Flux | 20–35 |

4. A ceramic body as defined in claim 3, wherein the flux is selected from the group consisting of feldspar and nepheline syenite and mixtures thereof.

5. A ceramic body comprising the vitrified product of a mixture of clay, flux material, and flint, the flint raw material being in particles having sizes falling within the following limits:

| Equivalent spherical diameter (ESD), microns | Percent finer than ESD | |
| --- | --- | --- |
|  | Upper limit | Lower limit |
| 1 |  |  |
| 2 | 0 | 0 |
| 3 | 0 | 7 |
| 5 | 0 | 10 |
| 8 | 0 | 17 |
| 10 | 0 | 54 |
| 12 | 9 | 76 |
| 15 | 30 | 88 |
| 20 | 55 | 96 |
| 30 | 81 | 100 |
| 40 | 93 | 100 |
| 45 | 98 | 100 |
|  | 100 | 100 |

6. A ceramic body as defined in claim 5, wherein the raw material flint size distribution is approximately as follows:

| Equivalent spherical diameter (ESD), microns: | Percent finer than ESD |
|---|---|
| 3 | 0 |
| 5 | 4 |
| 8 | 31 |
| 10 | 48 |
| 12 | 62 |
| 15 | 78 |
| 20 | 92 |
| 30 | 100 |

7. An electrical insulator comprising a porcelain body and a glaze coating on the surface thereof, said glaze coating having a coefficient of expansion of about 4.7 to $5.8 \times 10^{-6}/°$ C. from 50 to 660° C. and said porcelain body having a coefficient of expansion of about 6.3 to $6.6 \times 10^{-6}/°$ C. from 50 to 750° C., said glaze coating being under compression, said porcelain body being composed of the vitrified product of a mixture of clay, flux material, and flint, the flint being in particles all of which have a size between 1 and 45 microns.

8. An electrical insulator comprising a porcelain body and a glaze coating on the surface thereof, said glaze coating having a coefficient of expansion of about 4.7 to $5.8 \times 10^{-6}/°$ C. and said porcelain body having a coefficient of expansion of about 6.3 to $6.6 \times 10^{-6}/°$ C., said glaze coating being under compression, said porcelain body being composed of the vitrified product of a mixture of clay, flux material, and flint, the flint being in particles having a range of size distribution as follows:

| Equivalent spherical diameter (ESD), microns | Percent finer than ESD | |
|---|---|---|
| | Upper limit | Lower limit |
| 1 | 0 | 0 |
| 2 | 0 | 7 |
| 3 | 0 | 10 |
| 5 | 0 | 17 |
| 8 | 0 | 54 |
| 10 | 9 | 76 |
| 12 | 30 | 88 |
| 15 | 55 | 96 |
| 20 | 81 | 100 |
| 30 | 93 | 100 |
| 40 | 98 | 100 |
| 45 | 100 | 100 |

9. An electrical insulator comprising a porcelain body and a glaze coating on the surface thereof, said glaze coating having a coefficient of expansion of about 4.7 to $5.8 \times 10^{-6}/°$ C. and said porcelain body having a coefficient of expansion of about 6.3 to $6.6 \times 10^{-6}/°$ C., said glaze coating being under compression, said porcelain body being composed of the vitrified product of a mixture of clay, flux material, and flint, the flint being in particles having a size distribution approximately as follows:

| Equivalent spherical diameter (ESD), microns: | Percent finer than ESD |
|---|---|
| 3 | 0 |
| 5 | 4 |
| 8 | 31 |
| 10 | 48 |
| 12 | 62 |
| 15 | 78 |
| 20 | 92 |
| 30 | 100 |

10. The method of increasing the mechanical and electrical strength of porcelain made of a mixture of clay, flux, and flint, which comprises incorporating in said mixture flint particles all of which have a size within the range of 1 to 45 microns.

11. The method of increasing the mechanical and electrical strength of porcelain made of a mixture of clay, flux, and flint, which comprises incorporating in said mixture flint particles all of which have a size within the range of 8 to 25 microns.

12. The method of increasing the mechanical and electrical strength of porcelain made of a mixture of clay, flux, and flint, which comprises incorporating in said mixture flint particles all of which have a size within the following range of distribution:

| Equivalent spherical diameter (ESD), microns | Percent finer than ESD | |
|---|---|---|
| | Upper limit | Lower limit |
| 1 | 0 | 0 |
| 2 | 0 | 7 |
| 3 | 0 | 10 |
| 5 | 0 | 17 |
| 8 | 0 | 54 |
| 10 | 9 | 76 |
| 12 | 30 | 88 |
| 15 | 55 | 96 |
| 20 | 81 | 100 |
| 30 | 93 | 100 |
| 40 | 98 | 100 |
| 45 | 100 | 100 |

13. The method of increasing the mechanical and electrical strength of porcelain made of a mixture of clay, flux, and flint, which comprises incorporating in said mixture flint particles having the following size distribution:

| Equivalent spherical diameter (ESD), microns: | Per cent finer than ESD |
|---|---|
| 3 | 0 |
| 5 | 4 |
| 8 | 31 |
| 10 | 48 |
| 12 | 62 |
| 15 | 78 |
| 20 | 92 |
| 30 | 100 |

14. A ceramic body as defined in claim 5, wherein said mixture comprises 30–60% clay, 20–35% flux material, and 15–35% flint.

References Cited in the file of this patent

UNITED STATES PATENTS

| 2,389,386 | Russell | Nov. 20, 1945 |
| 2,590,893 | Sanborn | Apr. 1, 1952 |
| 2,782,125 | Butler | Feb. 19, 1957 |

OTHER REFERENCES

Green et al.: "Ceramics—A Symposium," pub. 1953 by The British Ceramic Soc., Stoke-on-Trent (pages 227, 241–243, and 250).

Green et al.: "Ceramics—A Symposium," pub. 1953 by The British Ceramic Soc., Stoke-on-Trent (pages 276, Table 11).

Koenig: Bulletin of Amer. Ceram. Soc., volume 19, 1940 (pages 424–30), Particle-Size Distribution of Ingredients Versus Body Properties.